US006669224B2

(12) United States Patent
Newkirk

(10) Patent No.: US 6,669,224 B2
(45) Date of Patent: Dec. 30, 2003

(54) DOCKING ASSEMBLY

(75) Inventor: David C. Newkirk, Lawrenceburg, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 10/293,629

(22) Filed: Nov. 13, 2002

(65) Prior Publication Data

US 2003/0067142 A1 Apr. 10, 2003

Related U.S. Application Data

(62) Division of application No. 09/310,250, filed on May 12, 1999, now Pat. No. 6,481,739.

(51) Int. Cl.[7] .................................................. B60D 1/00

(52) U.S. Cl. ........................ 280/508; 280/504; 280/477

(58) Field of Search ................................. 280/483, 484, 280/489, 504, 515, 491.5, 491.3, 492, 486, 480.1, 477, 411.1, 400, 493, 488, 508; 172/439, 445; 114/250; 5/510, 600; 248/229.16

(56) References Cited

U.S. PATENT DOCUMENTS

| | | | | | |
|---|---|---|---|---|---|
| 3,117,805 | A | * | 1/1964 | Schoeffler | 280/491.3 |
| 3,580,612 | A | * | 5/1971 | Pearson | 280/492 |
| 4,729,576 | A | * | 3/1988 | Roach | 280/493 |
| 4,844,497 | A | * | 7/1989 | Allen | 280/477 |
| 4,947,779 | A | * | 8/1990 | Grinde | 114/250 |
| 5,117,521 | A | * | 6/1992 | Foster et al. | 5/510 |
| 5,118,127 | A | * | 6/1992 | Partington | 280/488 |
| 5,183,284 | A | * | 2/1993 | Paplinski | 280/508 |
| 5,337,845 | A | * | 8/1994 | Foster et al. | 180/11 |
| 5,898,961 | A | * | 5/1999 | Ambach et al. | 5/600 |
| 6,179,260 | B1 | * | 1/2001 | Ohanian | 248/229.16 |
| 6,227,305 | B1 | * | 5/2001 | Sayer | 172/439 |
| 6,481,739 | B1 | * | 11/2002 | Newkirk | 280/484 |

* cited by examiner

*Primary Examiner*—Lesley D. Morris
*Assistant Examiner*—Daniel Yeagley
(74) *Attorney, Agent, or Firm*—Barnes & Thornburg

(57) ABSTRACT

A docking assembly configured to allow a first medical device to move with a second medical device includes a hitch, a base, and a connector. The hitch is configured to be coupled to the first medical device. The base is spaced apart from the hitch and is configured to be coupled to the second medical device. The connector interconnects the hitch and the base and permits movement of the hitch relative to the base.

46 Claims, 8 Drawing Sheets

DOCKING ASSEMBLY

This is a divisional of application Ser. No. 09/310,250 filed May 12, 1999, now U.S. Pat. No. 6,481,739.

BACKGROUND AND SUMMARY OF THE INVENTION

The present invention relates to a docking assembly for medical equipment. More particularly, the present invention relates to a docking assembly that allows one piece of medical equipment to be hitched to a second piece of medical equipment to allow the second piece of medical equipment to be towed with the first piece of medical equipment.

It is often desirable to couple a first medical device to a second medical device so that the first medical device can be towed along with (or by) the second medical device as the second medical device is rolled along the floor.

In an illustrated embodiment of the invention, a docking assembly configured to allow a first medical device to move together with a second medical device includes a hitch, a base, and a connector. The hitch can be coupled to and decoupled from the first medical device. The base is spaced apart from the hitch and is coupled to the second medical device. The connector interconnects the hitch and the base and allows movement of the hitch relative to the base.

In the illustrated embodiment, the connector allows vertical movement of the hitch relative to the base. The connector also allows rotational movement of the hitch relative to the base about a longitudinal axis defined by the connector. The connector of the illustrative embodiment, however, blocks horizontal movement of the hitch relative to the base so that the first medical device can tow the second medical device, even over an irregular surface, without suffering from unintended decoupling.

In the illustrated embodiment, the connector includes at least one leaf spring extending between the hitch and the base. The leaf spring is made from a flexible material. The hitch is movable when decoupled from the first medical device between an extended position and a retracted position. In the extended position, the hitch extends beyond a footprint of the second medical device and in the retracted position, the hitch resides within the footprint of the second medical device.

Also in the illustrated embodiment of the present invention, a docking assembly couples a first medical device having a latch receiver to a second medical device. The docking assembly includes a hitch, a base, and a connector. The hitch can be coupled to and decoupled from the latch receiver and has a central finger. The base is spaced apart from the hitch and is coupled to the second medical device. The base has a central finger. The connector interconnects the hitch and the base. The connector includes a first leaf spring and a second leaf spring extending between the hitch and the base. The first and second leaf springs lie on opposite sides of the central finger in substantially parallel relation. The first and second leaf springs allow rotational movement of the hitch relative to the base about a longitudinal axis defined by the spring.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying drawings in which.

DETAILED DESCRIPTION OF THE DRAWINGS

Figure 1:
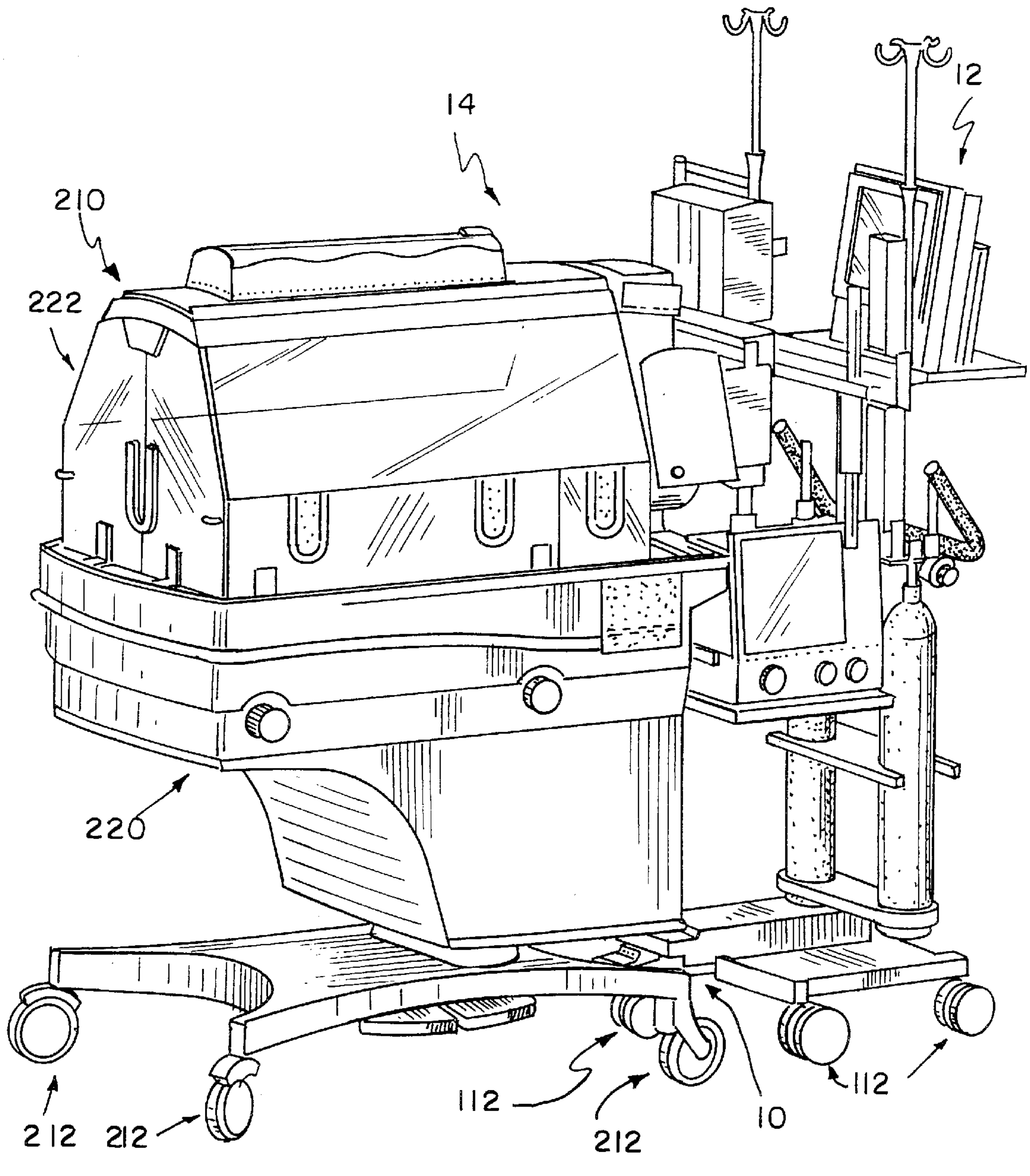
FIG. 1 is a perspective view of an accessory cart being coupled to an incubator using a docking assembly in accordance with the present invention.

Referring now to the drawings, FIG. 1 illustrates a docking assembly 10 in accordance with the present invention. As shown in FIG. 1, docking assembly 10 allows a first medical device, in this instance an accessory cart 12, to be coupled to a second medical device, in this instance an incubator 14, so that accessory cart 12 can be towed behind incubator 14. Docking assembly 10 is securely fastened to incubator 14 and allows accessory cart 12 to be hitched and unhitched as desired from incubator 14. As described in more detail below and shown in FIG. 2, docking assembly 10 allows accessory cart 12 to move rotationally (arrow 16) and vertically (arrow 17) relative to incubator 14 as accessory cart 12 is towed behind incubator 14 to compensate for bumps and the like on the floor, but prevents accessory cart 12 from moving horizontally (arrow 18) relative to incubator 14 so that accessory cart 12 is easily steered behind incubator 14 when accessory cart 12 is hitched to docking assembly 10.

Although accessory cart 12 and incubator 14 are described in detail herein as being an accessory cart and an incubator, respectively, the docking assembly of the present invention may be used with a wide variety of medical devices. For example, first medical device 12 and/or second medical device 14 could also be a resuscitation accessory module, a back-up battery pack, a hospital bed, or any other type of medical device that is capable of being docked or coupled to another type of medical device. Therefore, accessory cart 12 is occasionally referred to herein as being a first medical device and incubator 14 is occasionally referred to herein as being a second medical device, thereby indicating the general applicability of the docking assembly of the current invention to various kinds of medical devices.

Figure 2:
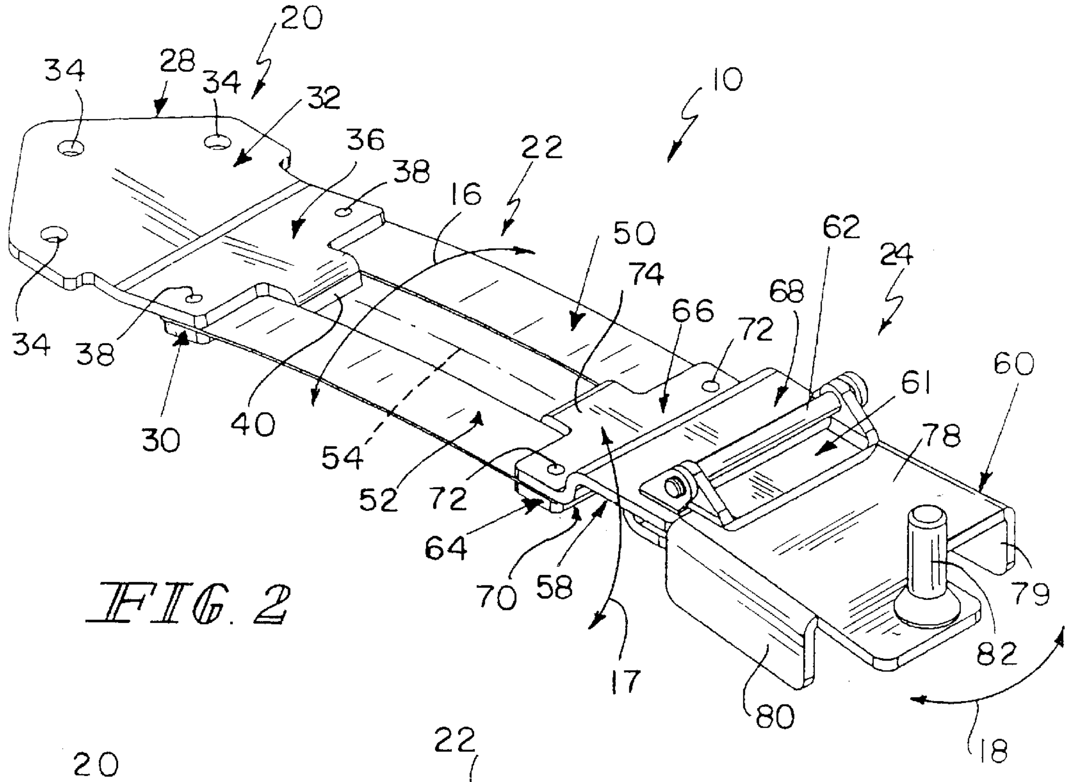
FIG. 2 is a perspective view of the docking assembly of FIG. 1 showing the docking assembly including a base, an opposite hitch, and a connector extending between the base and the hitch.
Figure 3:
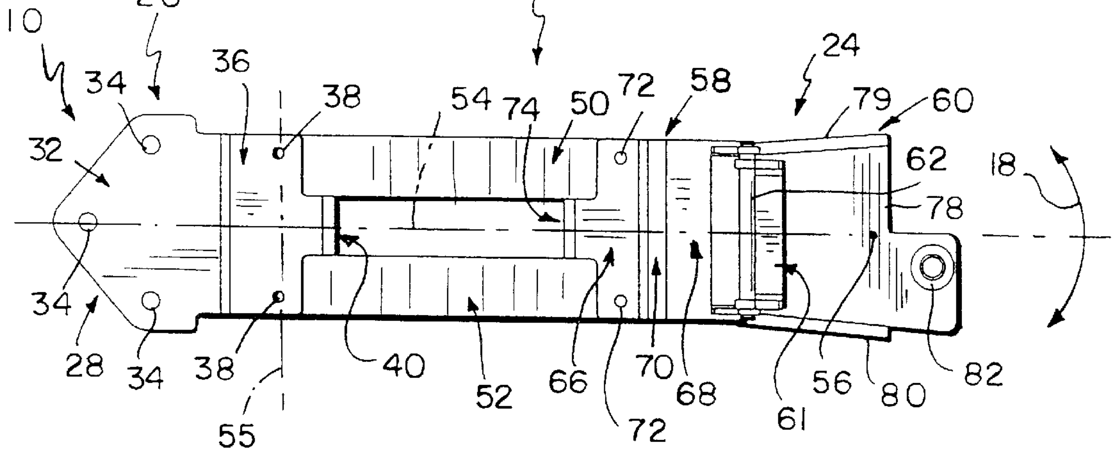
FIG. 3 is a top view of the docking assembly of FIG. 2.
Figure 4:
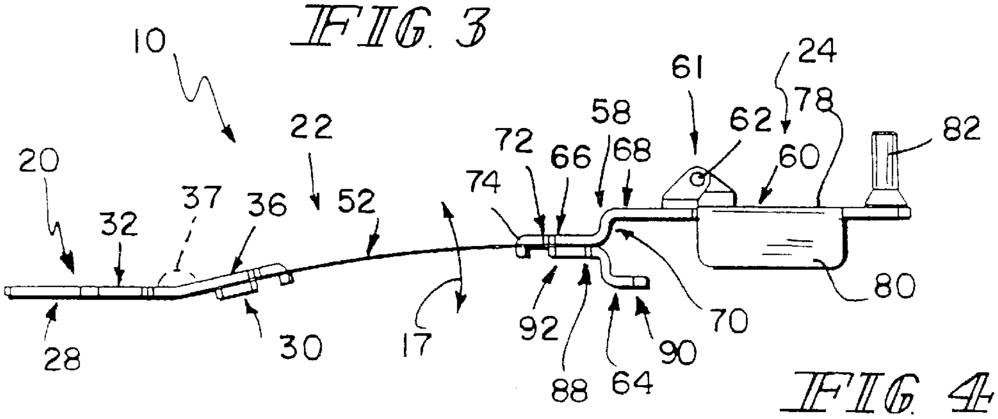
FIG. 4 is a side view of the docking assembly of FIG. 2.

Docking assembly 10 includes a base 20, a connector 22 extending from base 20, and a hitch 24 extending from connector 22, as shown in FIGS. 2–4. As shown in FIG. 2, base 20 includes a base plate 28 and a retainer 30 positioned to lie below base plate 28. Base plate 28 allows docking assembly 10 to be coupled to incubator 14 and cooperates with retainer 30 to couple base 20 to connector 22 of docking assembly 10.

Base plate 28 includes a mounting portion 32 and a coupling portion 36 extending inwardly from mounting portion 32 toward a center of docking assembly 10, as shown in FIGS. 2 and 4. Mounting portion 32 is formed to include three holes 34 to allow mounting portion 32 to be coupled to incubator 14. As shown illustratively in FIG. 7, base plate 28 is coupled to an underside of incubator 14 using three screws (not shown) that extend through the three holes 34 in mounting portion 32.

Coupling portion 36 extends from mounting portion 32 at an angle 37, as shown in FIG. 4. Coupling portion 36 is formed to include two laterally spaced-apart holes 38 and a central finger 40 extending inwardly relative to mounting portion 32 from a location between holes 38. Retainer 30 is also formed to include two holes (not shown) that are sized and spaced to align with holes 38 of coupling portion 36. A fastener such as a rivet or screw (not shown) extends through each of the two holes 38, through each hole (not shown) formed in retainer 30, and through a pair of first holes (not shown) formed in connector 22 to couple base 20 to connector 22, as shown in FIGS. 2–4.

In the preferred embodiment, connector 22 includes first and second leaf springs 50, 52, respectively, as shown in FIGS. 2–4. Leaf springs 50, 52 extend longitudinally away from retainer 30 and coupling portion 36 of base 20 and are positioned to lie on opposite sides of central finger 40, as shown in FIGS. 2 and 3. Each leaf spring 50, 52 extends between coupling portion 36 and retainer 30. Each leaf spring 50, 52 is formed to include a first hole (not shown) that is aligned with holes 38 of coupling portion 36. A fastening mechanism (not shown), such as a screw or a rivet, extends through the holes in coupling portion 36, through the holes in leaf springs 50, 52, and through the holes in retainer 30 to sandwich leaf springs 50, 52 between base plate 28 and retainer 30. Each leaf spring 50, 52 also includes a second hole (not shown) positioned on an opposite end of each leaf spring 50, 52 to couple connector 22 to hitch 24, as described below. Each leaf spring 50, 52 is preferably made from a flexible material such as steel, spring steel, stainless steel, or composite plastic material (such as carbon fiber) and is rectangularly shaped, as shown in FIG. 2.

Hitch 24 extends from connector 22 and allows accessory cart 12 to be hitched (or docked) to docking assembly 10. Hitch 24 includes a transition plate 58, a latch plate 60, a hinge 61 having a hinge pin 62 and pivotably interconnecting transition plate 58 and latch plate 60 about an axis defined by hinge pin 62, and a bottom guide 64 positioned to lie below transition plate 58. As shown in FIGS. 2 and 4, transition plate 58 includes a mounting portion 66, a coupling portion 68, and an S-shaped transition portion 70 interconnecting mounting portion 66 and coupling portion 68. Mounting portion 66 is formed to include a pair of laterally spaced-apart holes 72 and a central finger 74 extending inwardly relative to transition plate 58 from a location between holes 72. Holes 72 of mounting portion 66 are sized and spaced to align with second holes (not shown) of leaf springs 50, 52 to couple leaf springs 50, 52 to mounting portion 66.

Latch plate 60 is coupled to coupling portion 68 of transition plate 58 using hinge 61, as shown in FIGS. 2–4. Latch plate 60 includes a top plate 78, two downwardly extending side plates 79, 80, and a post 82 extending upwardly from top plate 78. Latch plate 60 is configured to pivot about hinge pin 62 relative to transition plate 58 to move latch plate 60 from a retracted position (FIG. 7) to an extended position (FIG. 8).

Figure 9:
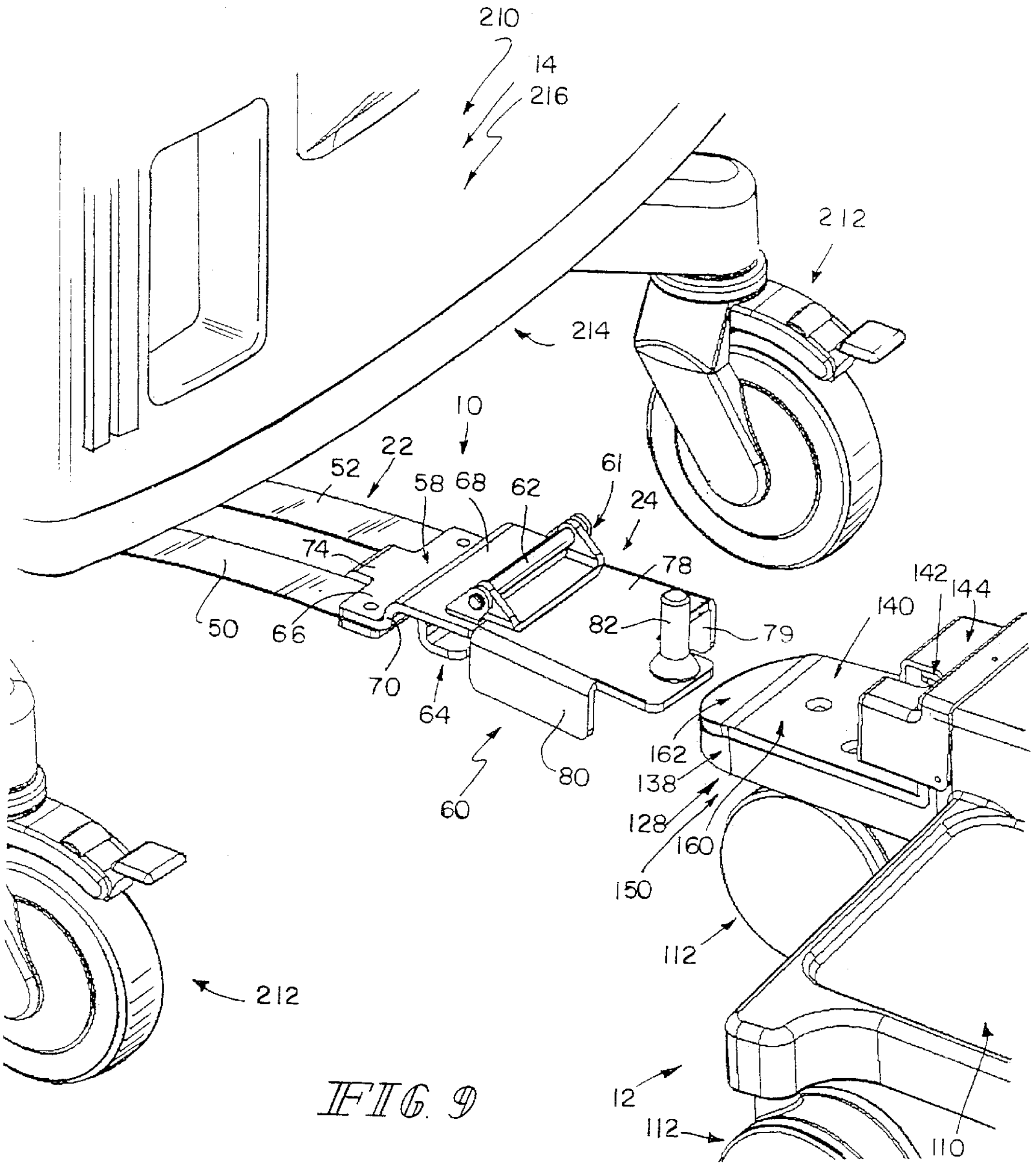
FIG. 9 is a perspective view similar to FIG. 8 showing the hitch of the docking assembly just before the latch receiver of the accessory cart is hitched to the hitch.
Figure 10:
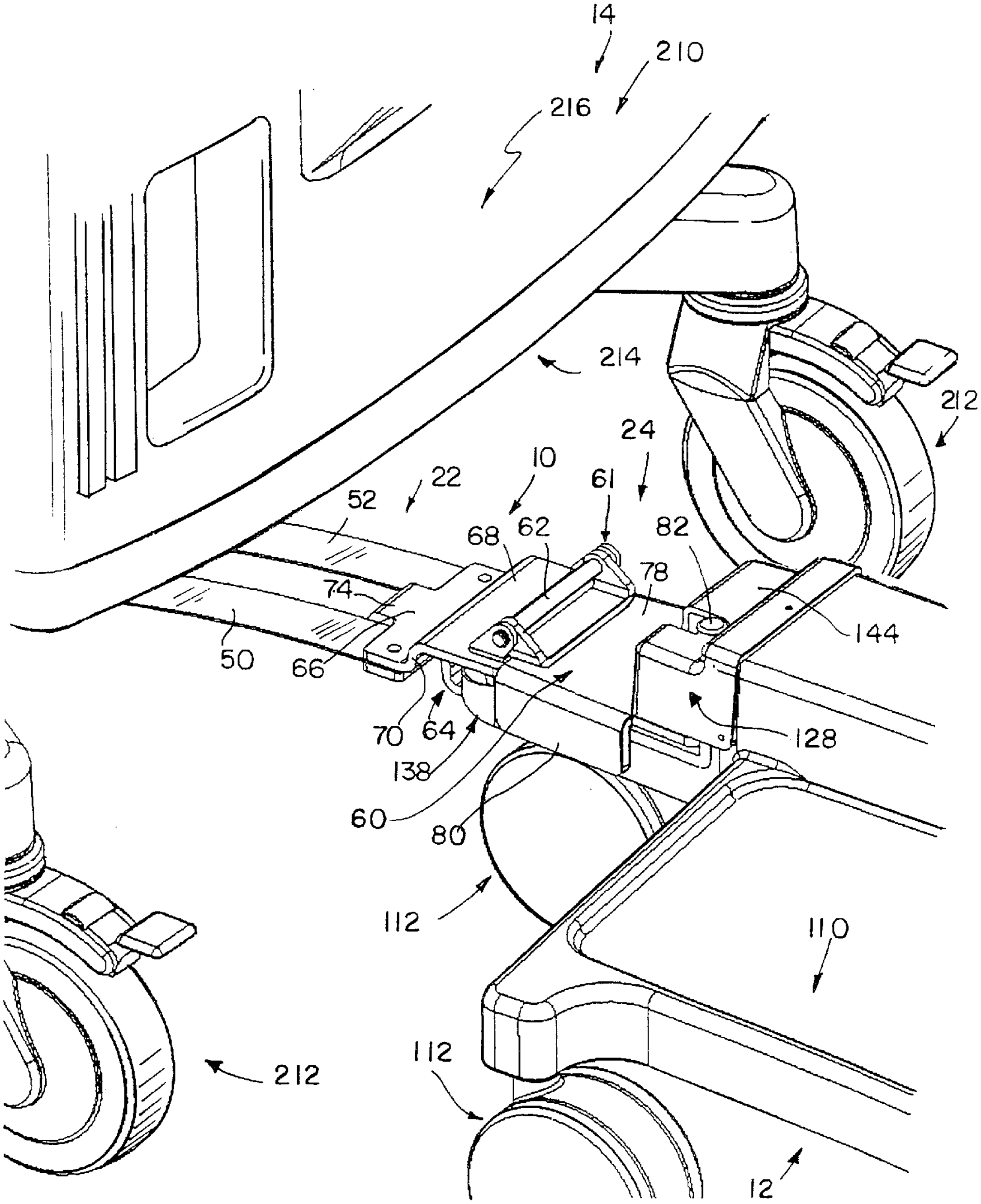
FIG. 10 is a perspective view similar to FIG. 9 showing the latch receiver of the accessory cart hitched to the hitch of the docking assembly so that the accessory cart may be towed behind the incubator.

Bottom guide 64 includes a coupling portion 88 and a guide portion 90, as shown in FIG. 4. Coupling portion 88 is formed to include a pair of holes 92 that are aligned with holes 72 of transition plate 58 to couple leaf springs 50, 52 between transition plate 58 and bottom guide 64 using a screw, a rivet, or some other suitable fastener, as discussed above. Guide portion 90 cooperates with top plate 78 and side plates 79, 80 to allow hitch 24 to mate with accessory cart 12, as shown in FIGS. 9 and 10.

Connector 22 is configured to allow hitch 24 to move rotationally 16 relative to base 20 about a longitudinal axis 54 defined by connector 22, as shown in FIGS. 2 and 3. It can be seen that upon being subjected to a first torque indicated by reference number 16, such as when one wheel 112 or 212 of one of first and second medical devices rolls over an irregularity, connector 22 will flex, permitting rotation of hitch 24 relative to base 20 about axis 54. Specifically, leaf spring 50 will flex in a first direction and leaf spring 52 will flex in an opposite second direction permitting the rotation of hitch 24 relative to base 20. Of course, upon flexure, connector 22 will apply a second torque opposing the first torque to urge hitch 24 and base 20 back to their original relative positions to maintain the stability of docking assembly 10. It will be understood by those skilled in the art that connector 22 could include a coil spring having an axis coextensive with axis 54, a rotating mechanical axis that relies upon gravity acting on the first and second medical devices to retain the stability of docking assembly 10, or any similar device or combination of devices that permits the desired rotation about axis 54.

Connector 22 is also configured to allow hitch 24 to move vertically 17 relative to base 20 about a transverse axis 55 defined by holes 38 of coupling portion 36, as shown in FIGS. 2–4. It can be seen that upon being subject to a first vertical force, indicated by reference number 17, such as when side-by-side wheels 112 or 212 of one of first and second medical devices roll over a door threshold or a gap between a floor and an elevator, connector 22 will flex, permitting the vertical movement of hitch 24 relative to base 20. Specifically, leaf springs 50, 52 will flex about axis 55 permitting the vertical movement of hitch 24 relative to base 20. Of course, upon flexure, connector 22 will apply a second vertical force opposing the first vertical force to urge hitch 24 and base 20 back to their original relative positions to maintain the stability of docking assembly 10. It will be understood by those skilled in the art that connector 22 could include a hinge having an axis coextensive with axis 55, a universal joint, a rigid connector including, for example, a first portion being a vertical post or bar that can slide within an opening formed in a second portion, perhaps relying on gravity to retain the stability of docking assembly 10, or any similar device or combination of devices that permits the relative vertical movement of hitch 24 and base 20. The rotational and vertical movement 16, 17 of hitch 24 relative to base 20 allow accessory cart 12 to easily move over minor floor obstructions or irregularities when being towed behind incubator 14.

Connector 22 also blocks hitch 24 from moving horizontally 18 relative to base 20 about a vertical axis 56 perpendicular to longitudinal axis 54, as shown in FIGS. 2 and 3. This blocking of horizontal movement 18 of hitch 24 relative to base 20 allows accessory cart 12 to remain behind incubator 14 without twisting hitch 24. This, in turn, allows the steering of the combined/hitched accessory cart 12 and incubator 14 to be accomplished by pushing (from behind) on the accessory cart 12 and/or pulling (from in front) on the incubator 14. In other words, connector 22 allows the combined unit of the accessory cart 12 and the incubator 14 to be steered from either the front or the rear of the unit. Thus, docking assembly 10 can be used with a first medical device and a second medical device to permit moving first medical device with second medical device. It is clear that docking assembly 10 can be used to tow second medical device behind first medical device. It is also clear that docking assembly 10 can be used to push second medical device in front of first medical device.

Figure 5:
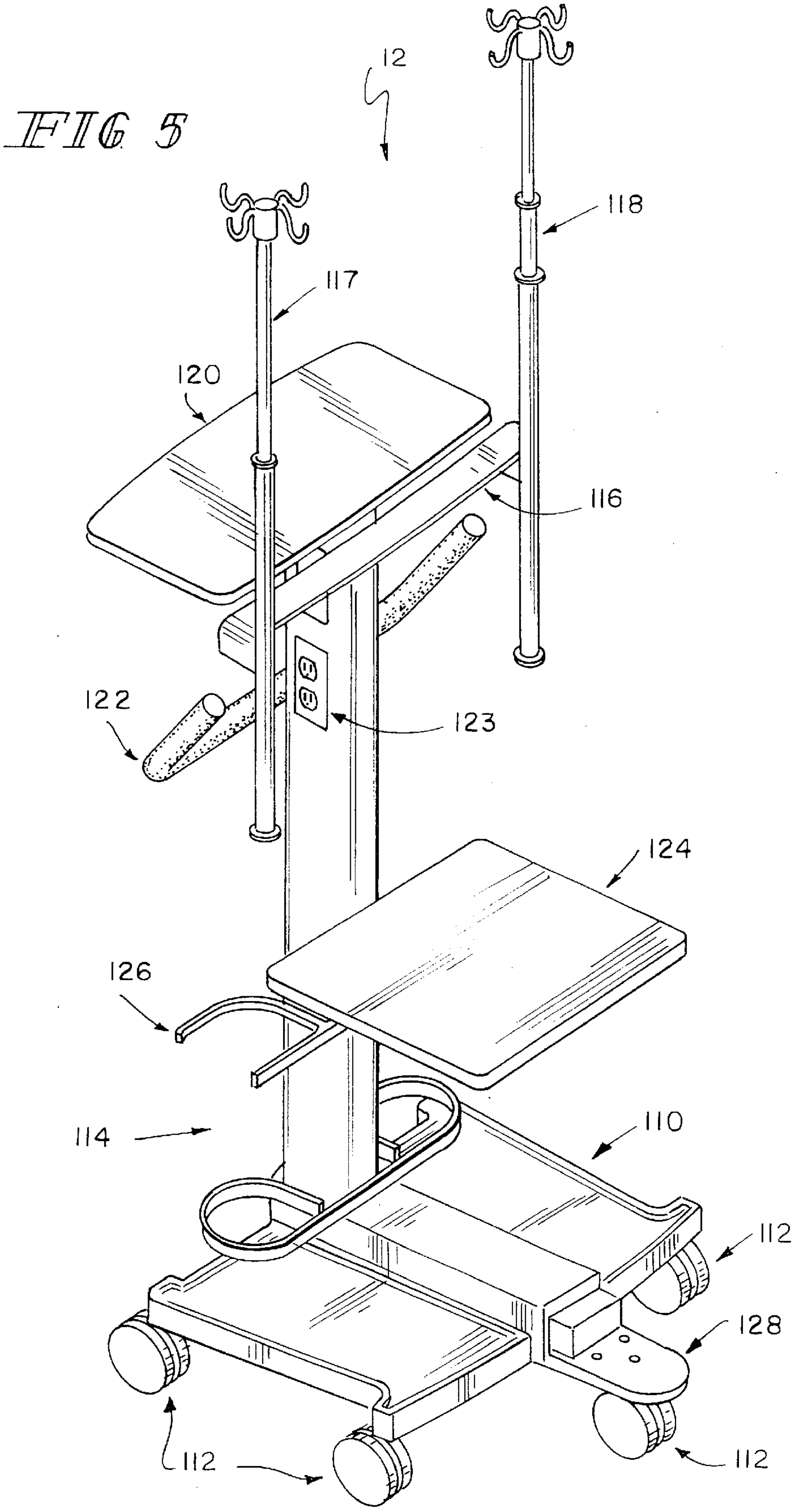
FIG. 5 is a perspective view of the accessory cart of FIG. 1 showing the cart having a cart base coupled to casters, a support column extending upwardly from the cart base, a plurality of accessory shelves coupled to the support column, and a latch receiver coupled to the cart base.

An illustrative first medical device 12 is shown in more detail in FIG. 5. As shown in FIG. 5, device 12 may be an accessory cart having a cart base 110 that rides on rollers 112, a support column 114 extending upwardly from cart base 110, a plurality of accessory members 116–126 coupled to support column 114, and a latch receiver 128 coupled to cart base 110. Rollers 112 can be any revolving cylinder over or on which something is moved, such as a caster or a wheel. As shown in FIG. 5, accessory member 116 may be an accessory rail coupled to support column 14 having a pair of IV poles 117, 118 extending vertically therefrom. Accessory member 120 may be an equipment shelf coupled to the top of support column 114 and positioned adjacent to accessory rail 116. Accessory member 122 may preferably be a handle extending outwardly from support column 114 to allow a user to move accessory cart 12 upon rollers 112. Accessory member 123 may be an AC power outlet coupled to support column 114. Accessory member 124 may be a ventilator shelf extending outwardly from support column 114. Accessory member 126 may be an oxygen bottle holder extending outwardly from ventilator shelf 124. Although accessory cart 12 is described in detail, the docking assembly 10 of the present invention may be used with virtually any kind of medical device that is desired to be towed behind another medical device.

Figure 6:
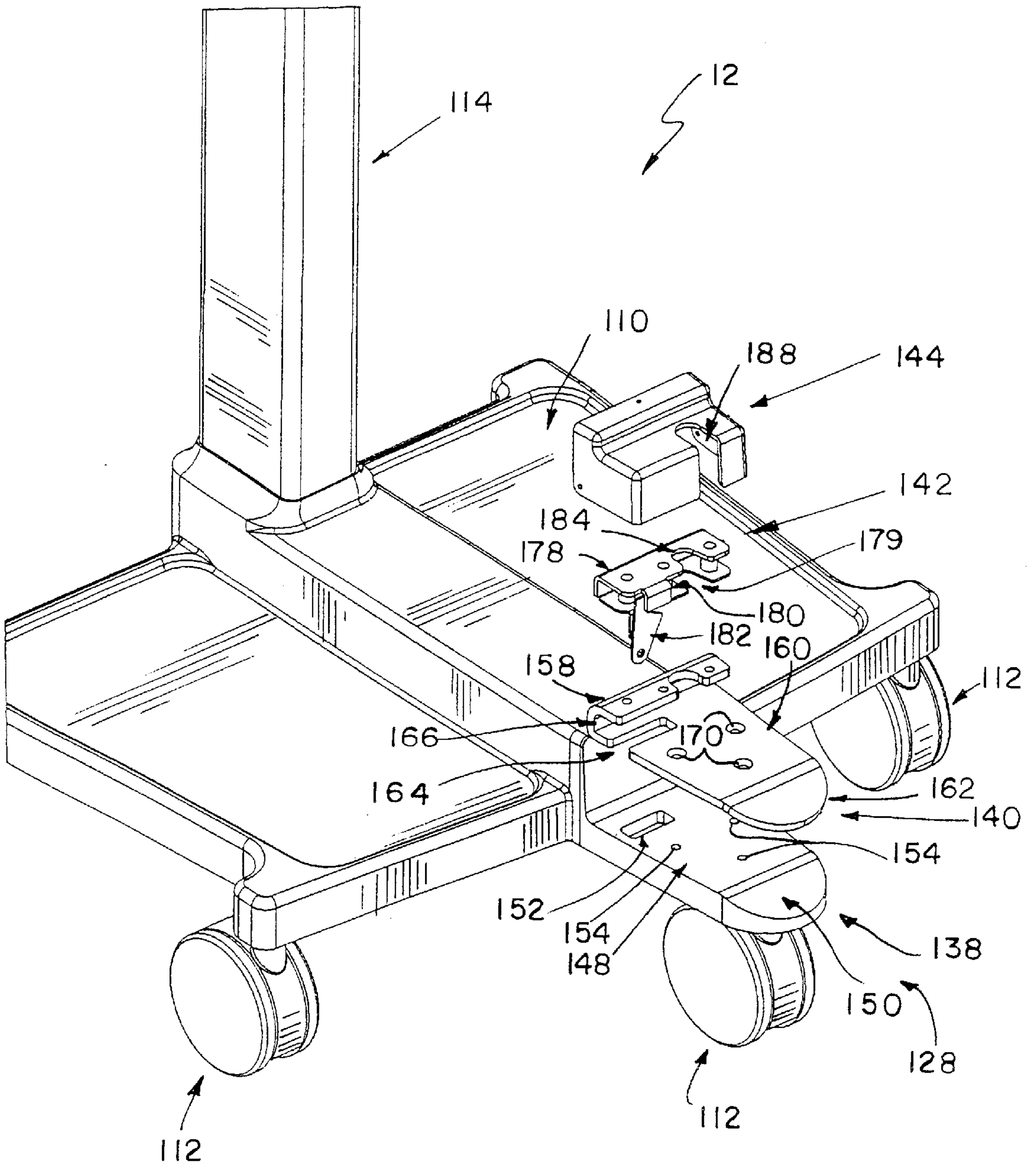
FIG. 6 is an exploded perspective view of the latch receiver of FIG. 5 showing the latch receiver having a base member coupled to the cart base, a latch plate configured to be coupled to the base member, a latch mechanism configured to be coupled to the latch plate, and a cover configured to conceal the latch mechanism.

Latch receiver 128 of first medical device 12 is shown in more detail in FIG. 6. Latch receiver 128 includes a base member 138, a latch plate 140 configured to lie on base member 138, a latch mechanism 142 configured to be coupled to latch plate 140, and a cover 144 configured to cover latch mechanism 142. Base member 138 includes a mount portion 148 extending outwardly from base 110 of accessory cart 12 and a guide portion 150 extending outwardly from mount portion 148. Mount portion 148 is formed to include a slot 152 and three holes 154. Slot 152 and holes 154 are sized and spaced to allow latch plate 140 and latch mechanism 142 to be coupled to base member 138, as described below.

Latch plate 140 of latch receiver 128 includes a mechanism mount portion 158, a base mount portion 160 extending outwardly from mechanism mount portion 158, and a guide portion 162 extending outwardly from base mount portion 160. Mechanism mount portion 158 is C-shaped and extends from base mount portion 160 to define a slot 164 between mechanism mount portion 158 and base mount portion 160. The C-shape of mechanism mount portion 158 defines an opening 166 that is sized to receive latch mechanism 142, as discussed below. Base mount portion 160 of latch plate 140 is formed to include three holes 170 that are sized and spaced to align with the three holes 154 of base member 138 to allow latch plate 140 to be coupled to base member 138 using screws or the like. Guide portion 162 is configured to angle slightly downwardly, as shown in FIG. 9, to help guide latch plate 60 of docking assembly 10 onto accessory cart 12.

Latch mechanism 142 includes a base portion 178 and a latch 180 coupled to base portion 178, as shown in FIG. 6. Latch mechanism 142 is commercially available from Eberhard Manufacturing Co. located in Cleveland, Ohio. Base portion 178 is formed to define a recess 179 that is sized and shaped to received post 82 of docking assembly 10. Latch 180 includes a release member 182 and a latch member 184. Release member 182 is configured to extend through slot 164 in latch plate 140 and slot 152 in base member 138 so that a user may reach under base member 138 to move release member 182 from a closed position to a released position. Movement of release member 182 from the closed position to the released position causes latch member 184 to move from a latched position to an unlatched position to allow post 82 of docking assembly 10 to be hitched and unhitched from accessory cart 12.

Cover 144 of latch receiver 128 is formed to include a cut-out portion 188 that is sized and shaped to receive post 82 of docking assembly 10. Cover 144 is configured to be coupled to base 110 of medical device 12 so that latch mechanism 142 and mechanism mount portion 158 of latch plate 140 are enclosed by cover 144, as shown in FIG. 9. Cover 144 may be made from a stainless steel material.

Figure 7:
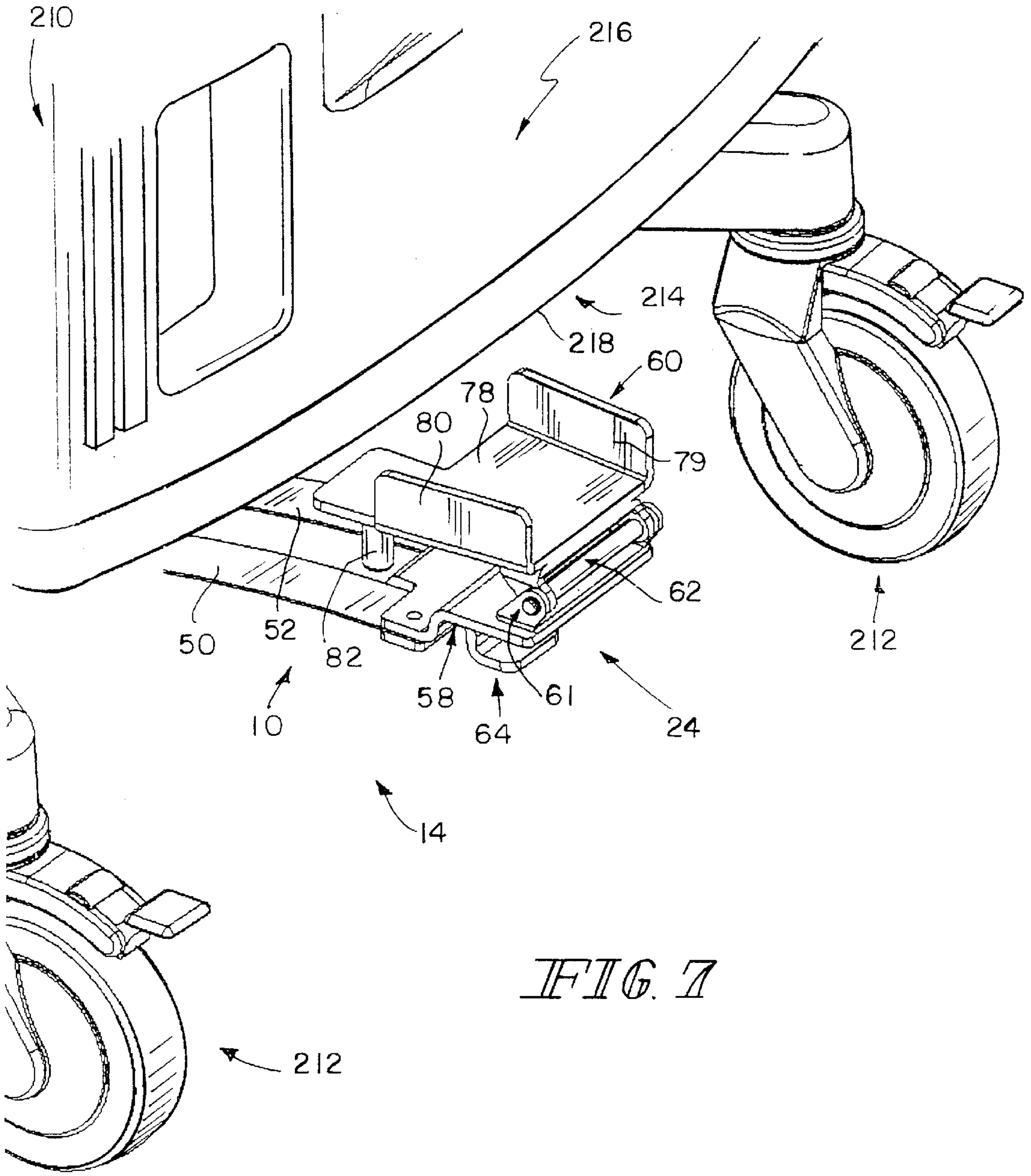
FIG. 7 is a perspective view of a back end of the incubator of FIG. 1 and the docking assembly of FIGS. 1–4 showing the docking assembly coupled to an underside of the back end of the incubator and showing the hitch of the docking assembly in a retracted position.
Figure 8:
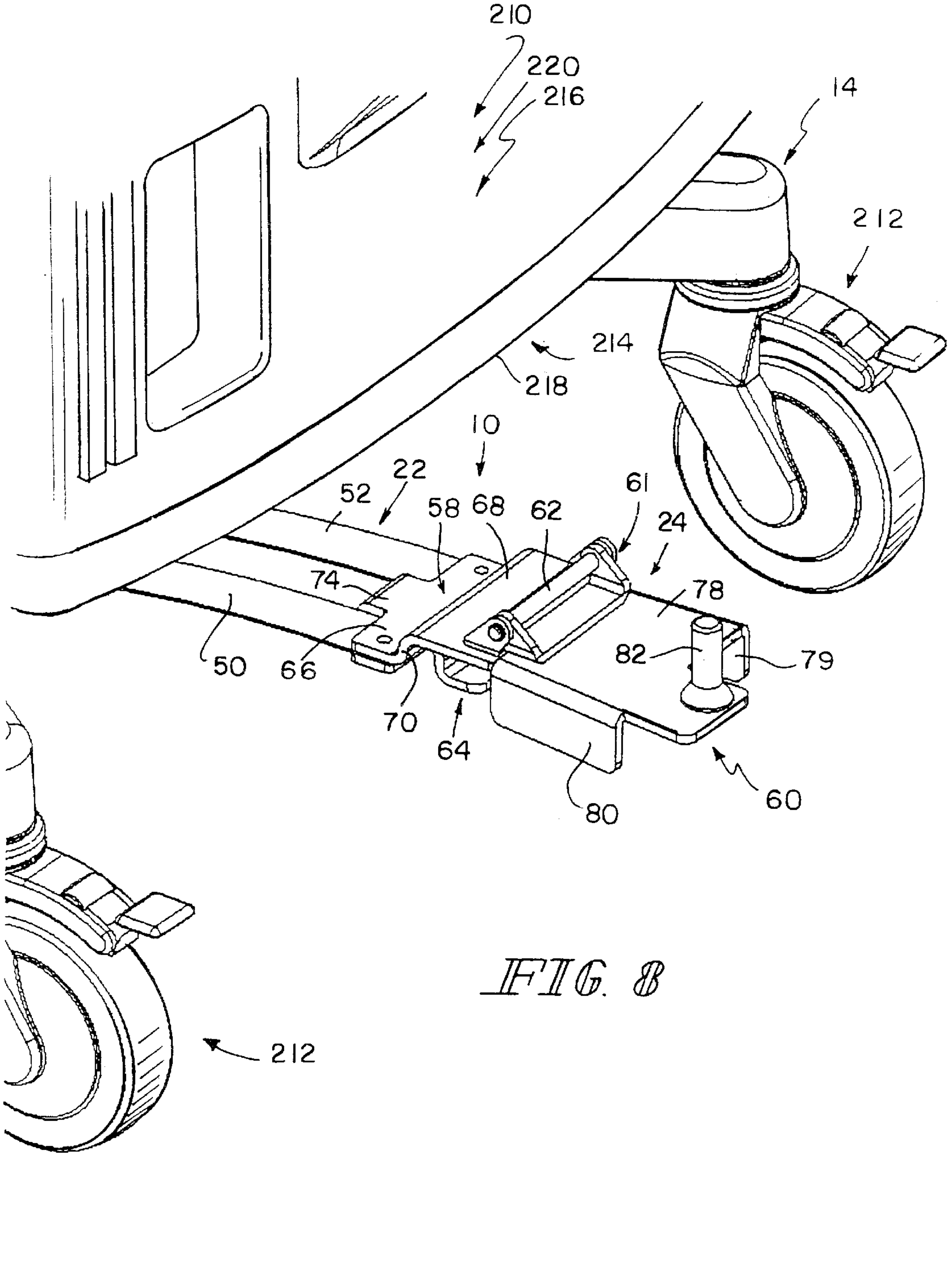
FIG. 8 is a perspective view similar to FIG. 7 showing the hitch of the docking assembly in an extended position.

Second medical device 14 is shown in FIGS. 1 and 7 as it would appear after being coupled to docking assembly 10. As shown in FIG. 1, second medical device 14 includes a body 210 that rides on rollers 212. Body 210 includes a base portion 220 and a hood or cover 222 positioned atop base portion 220. Rollers 212 can be any revolving cylinder over or on which something is moved, such as a caster or a wheel. An incubator similar to incubator 14, shown in FIGS. 1 and 7, is described in detail in U.S. patent application Ser. No. 08/926,380 filed Sep. 9, 1997 which is incorporated herein by reference.

As shown in FIG. 7, docking assembly 10 is coupled to an underside 214 of a back end 216 of base portion 220 of second medical device 14. Although not shown in FIG. 7, mounting portion 32 of base plate 28 of docking assembly 10 is preferably coupled to underside 214 of second medical device 14 using screws (not shown) that extend upwardly through holes 34 formed in base plate 28 and screw into a bottom surface 218 of second medical device 14. As shown in FIGS. 7–10, after docking assembly 10 is coupled to second medical device 14, connector 22 extends outwardly from second medical device 14 so that hitch 24 is accessible.

As shown in FIG. 7, hitch 24 may be moved to a retracted (storage) position when docking assembly 10 is not being used so that it is "out of the way". In the retracted position, latch plate 60 pivots relative to transition plate 58 about hinge pin 62 to be positioned on top of transition plate 58. In this position, docking assembly 10 resides entirely within a footprint of incubator 14 defined by the perimeter of rollers 212, as shown in FIG. 7. Thus, in the retracted position, docking assembly 10 does not interfere with the normal use of second medical device 14.

As shown in FIG. 8, hitch 24 may also be moved to an extended (use) position when docking assembly 10 is desired to couple first medical device 12 to second medical device 14. In the extended position, latch plate 60 is pivoted relative to transition plate 58 about hinge pin 62 so that hitch 24 extends beyond the perimeter defined by rollers 212. In this extended position, post 82 is substantially vertical and is ready to be coupled to latch receiver 128 of first medical device 12.

In operation, docking assembly 10 is used to couple first medical device 12 to second medical device 14 as shown in FIGS. 9 and 10. As shown in FIG. 9, after docking assembly 10 is positioned in the extended position, first medical device 12 is moved into alignment with second medical device 14 so that latch receiver 128 is adjacent to hitch 24. First medical device 12 is moved relative to second medical device 14 so that guide portions 150, 162 of latch receiver 128 extend under top plate 78 of docking assembly 10 and between side plates 79, 80 of docking assembly 10.

Medical devices 12, 14 are then further moved toward one another so that guide portions 150, 162 of latch receiver 128 are positioned between bottom guide 64 and transition plate 70 of docking assembly 10 and mount portions 184, 160 of latch receiver 128 are positioned between side plates 79, 80. Medical devices 12, 14 are then further moved toward one another until post 82 is received by latch mechanism 142 and latch member 184 extends about post 82 to secure hitch 24 to latch receiver 128 of first medical device 12. In this position, docking assembly 10 is securely coupled to latch receiver 128 so that first medical device 12 can be moved with second medical device 14.

To disconnect first medical device 12 from second medical device 14, release member 182 of latch mechanism 142 is moved from the closed position to the released position, as described above. This movement of release member 182 from the closed position to the released position causes latch member 184 to move from a latched position to an unlatched position to allow post 82 of docking assembly 10 to move away from accessory cart 12. Then, hitch 24 of docking assembly 10 can be moved from the extended position to the retracted (storage) position thereby positioning hitch 24 out of the way and allowing second medical device 14 to move independently from first medical device 12.

Although the invention has been described in detail with reference to a certain illustrated embodiment, variations and modifications exist within the scope and spirit of the invention as described and as defined in the following claims.

What is claimed is:

1. A combination comprising:

a first medical device having a first base and a first set of wheels coupled to the base, a second medical device having a second base and a second set of wheels coupled to the second base, a latch member coupled to the first medical device, and a docking assembly including a pair of spaced-apart leaf springs extending from the second medical device and a hitch coupled to the distal ends of the leaf springs, the hitch including a post, engagement between the post and the latch member moving the latch member automatically from a releasing position to a locking position to couple the first and second medical devices together to permit the first and second medical devices to be transportable together in tandem.

2. The combination of claim 1, wherein the hitch includes a hinge configured to permit movement of the post relative to the leaf spring.

3. The combination of claim 2, wherein the hinge is configured to permit movement of the post from a first position in which the post is accessible to the latch member and a second position in which the post is inaccessible to the latch member.

4. The combination of claim 2, wherein the hitch includes a first plate coupled to the hinge and coupled to the post and the hitch includes a second plate coupled to the hinge and coupled to the leaf spring.

5. The combination of claim 4, wherein the hinge is configured to permit movement of the first plate and the post about a horizontal axis between a first position in which the post extends generally upwardly from the first plate and a second position in which the post extends generally downwardly from the first plate.

6. The combination of claim 4, wherein the hinge is configured to permit movement of the first plate and post about a horizontal axis between a first position in which the first plate is substantially coplanar with the second plate and a second position in which the first plate overlies the second plate.

7. The combination of claim 4, wherein the hitch includes first and second side plates coupled to the first plate, the side plates extending from the first plate to define a space between the side plates, and the first medical device includes a portion that is received in the space when the first medical device is coupled to the second medical device by the docking assembly.

8. The combination of claim 1, wherein the docking assembly includes a plate coupled to a proximal end of the leaf spring and coupled to the second medical device.

9. The combination of claim 8, wherein the plate includes a first portion that is coupled to the second medical device and a second portion that coupled to the proximal end of the leaf spring and the second portion is inclined at an angle with respect to the first portion.

10. The combination of claim 1, wherein the first medical device includes a base and a base member extending outwardly from the base, the hitch includes a first plate coupled to the post and a pair of second plates extending from the first plate, and the base member is positioned to lie between the second plates when the first and second medical devices are coupled together.

11. The combination of claim 10, wherein the first plate overlies the base member when the first and second medical devices are coupled together.

12. The combination of claim 10, wherein the post extends upwardly from the first plate and the pair of second plates extend downwardly from the first plate.

13. The combination of claim 10, wherein the latch member is positioned to lie above the base member.

14. The combination of claim 10, wherein the pair of second plates engage the base member to prevent the first medical device from pivoting about the post relative to the second medical device.

15. A medical device comprising:

a base, at least one wheel coupled to the base, a docking assembly coupled to the base, the docking assembly including a leaf spring having a first end and a second end, a plate coupled to the first end of the leaf spring and to the base, and a hitch coupled to the second end of the leaf spring, the hitch including a post, the leaf spring extending from the plate in a cantilevered manner so that the leaf spring is subject to deflection, the plate including an inclined portion from which the leaf spring extends, at an angle with respect to horizontal so that the post is able to be maintained substantially vertical and in spaced-apart relation with the base.

16. The medical device of claim 15, wherein the hitch includes a hinge configured to permit movement of the post relative to the leaf spring.

17. The medical device of claim 16, wherein the hinge is configured to permit movement of the post between first and second positions and the post is closer to the leaf spring when in the second position than when in the first position.

18. The medical device of claim 16, wherein the hitch includes a first plate coupled to the post and coupled to the hinge and the hitch includes a second plate coupled to the leaf spring and coupled to the hinge.

19. The medical device of claim 18, wherein the hinge is configured to permit movement of the first plate and the post about a horizontal axis between a first position in which the post extends generally upwardly from the first plate and a second position in which the post extends generally downwardly from the first plate.

20. The medical device of claim 18, wherein the hinge is configured to permit movement of the first plate and post about a horizontal axis between a first position in which the first plate is substantially coplanar with the second plate and a second position in which the first plate overlies the second plate.

21. The medical device of claim 19, wherein the hitch includes first and second side plates extending from the first plate and the side plates are adapted to receive a portion of a second medical device therebetween.

22. An apparatus for coupling together a first medical device and a second medical device to permit the first and second medical devices to be transportable together in tandem, the apparatus comprising:

a latch member adapted to be coupled to the first medical device, and a docking assembly adapted to be coupled to the second medical device, the docking assembly including a pair of spaced-apart leaf springs and a hitch coupled to the distal ends of the leaf springs, the hitch including a post, the docking assembly being configured so that the pair of spaced-apart leaf springs extends from the second medical device in a cantilevered manner and supports the post in spaced-apart relation with the second medical device when the docking assembly is coupled to the first medical device, the latch member being configured to interact with the post to couple the first and second medical devices together.

23. The apparatus of claim 22, wherein the hitch includes a hinge configured to permit movement of the post relative to the leaf spring.

24. The apparatus of claim 23, wherein the hinge is configured to permit movement of the post from a first position in which the post is accessible to the latch member and a second position in which the post is inaccessible to the latch member.

25. The apparatus of claim 23, wherein the hitch includes a first plate coupled to the hinge and coupled to the post and the hitch includes a second plate coupled to the hinge and coupled to the leaf spring.

26. The apparatus of claim 25, wherein the hinge is configured to permit movement of the first plate and the post about a horizontal axis between a first position in which the post extends generally upwardly from the first plate and a second position in which the post extends generally downwardly from the first plate.

27. The apparatus of claim 25, wherein the hinge is configured to permit movement of the first plate and post about a horizontal axis between a first position in which the first plate is substantially coplanar with the second plate and a second position in which the first plate overlies the second plate.

28. The apparatus of claim 25, wherein the hitch includes first and second side plates coupled to the first plate, the side plates extend from the first plate to define a space between the side plates, and the space being sized and configured for receipt of a portion of the first medical device.

29. The apparatus of claim 22, wherein the docking assembly includes a plate coupled to a proximal end of the leaf spring and adapted to be coupled to the second medical device.

30. The apparatus of claim 29, wherein the plate includes a first portion that is adapted to be coupled to the second medical device and a second portion that is coupled to the proximal end of the leaf spring and the second portion is inclined at an angle with respect to the first portion.

31. The apparatus of claim 22, wherein the hitch includes a first plate coupled to the post, the hitch includes a pair of second plates extending from the first plate, and the second plates are adapted to be positioned outboard of a member of the first medical device when the first and second medical devices are coupled together.

32. The apparatus of claim 31, wherein the first plate is adapted to overlie the member of the first medical device when the first and second medical devices are coupled together.

33. The apparatus of claim 31, wherein the post extends upwardly from the first plate and the pair of second plates extend downwardly from the first plate.

34. The combination of claim 31, wherein the pair of second plates are adapted to engage the member of the first medical device to prevent the first medical device from pivoting about the post relative to the second medical device when the first and second medical devices are coupled together.

35. An apparatus for coupling together a first medical device and a second medical device to permit the first and second medical devices to be transportable together in tandem, the apparatus comprising:

a latch member adapted to be coupled to the first medical device, and a docking assembly including a leaf spring having a first end and a second end, a plate coupled to the first end of the leaf spring, and a hitch coupled to the second end of the leaf spring, the hitch including a post, the plate being adapted to be coupled to the second medical device, the leaf spring extending from the plate in a cantilevered manner so that the leaf spring is subject to deflection due to gravity, the plate including a first portion coupled to the second medical device and a second portion from which the leaf spring extends, the second portion is inclined with respect to horizontal by an amount that compensates for the deflection of the leaf spring due to gravity so that the post is maintained substantially vertical and in spaced-apart relation with the second medical device when the plate is coupled to the second medical device, the latch member being configured to interact with the post to couple the first and second medical devices together.

36. The apparatus claim 35, wherein the hitch includes a hinge configured to permit movement of the post relative to the leaf spring.

37. The apparatus of claim 36, wherein the hinge is configured to permit movement of the post from a first position in which the post is accessible to the latch member and a second position in which the post is inaccessible to the latch member.

38. The apparatus of claim 36, wherein the hitch includes a first plate coupled to the hinge and coupled to the post and the hitch includes a second plate coupled to the hinge and coupled to the leaf spring.

39. The apparatus of claim 38, wherein the hinge is configured to permit movement of the first plate and the post about a horizontal axis between a first position in which the post extends generally upwardly from the first plate and a second position in which the post extends generally downwardly from the first plate.

40. The apparatus of claim 38, wherein the hinge is configured to permit movement of the first plate and post about a horizontal axis between a first position in which the first plate is substantially coplanar with the second plate and a second position in which the first plate overlies the second plate.

41. The apparatus of claim 38, wherein the hitch includes first and second side plates coupled to the first plate, the side plates extend from the first plate to define a space between the side plates, and the space being sized and configured for receipt of a portion of the first medical device.

42. The apparatus of claim 35, wherein the first portion of the plate is adapted to be coupled to the second medical device and the second portion is coupled to the first end of the leaf spring and the second portion of the plate is inclined at an angle with respect to the first portion of the plate.

43. The apparatus of claim 35, wherein the hitch includes a first plate coupled to the post, the hitch includes a pair of second plates extending from the first plate, and the second plates are adapted to be positioned outboard of a member of the first medical device when the first and second medical devices are coupled together.

44. The apparatus of claim 43, wherein the first plate is adapted to overlie the member of the first medical device when the first and second medical devices are coupled together.

45. The apparatus of claim 43, wherein the post extends upwardly from the first plate and the pair of second plates extend downwardly from the first plate.

46. The combination of claim 43, wherein the pair of second plates are adapted to engage the member of the first medical device to prevent the first medical device from pivoting about the post relative to the second medical device when the first and second medical devices are coupled together.

* * * * *